(12) United States Patent
Durbin et al.

(10) Patent No.: US 7,163,148 B2
(45) Date of Patent: Jan. 16, 2007

(54) MAGNETIC STRIPE READER

(75) Inventors: William Gene Durbin, Austin, TX (US); Brent Wilson, Austin, TX (US)

(73) Assignee: Silicon Labs CP, Inc., Austin, TX (US)

( * ) Notice: Subject to any disclaimer, the term of this patent is extended or adjusted under 35 U.S.C. 154(b) by 124 days.

(21) Appl. No.: 10/816,265

(22) Filed: Mar. 31, 2004

(65) Prior Publication Data
US 2005/0219728 A1   Oct. 6, 2005

(51) Int. Cl.
*G06K 7/08*   (2006.01)
(52) U.S. Cl. ........................ 235/449; 235/493
(58) Field of Classification Search ................ 235/449, 235/493, 375, 450, 440
See application file for complete search history.

(56) References Cited

U.S. PATENT DOCUMENTS

| | | | | |
|---|---|---|---|---|
| 3,571,799 A | * | 3/1971 | Coker et al. ................. | 235/380 |
| 3,860,793 A | * | 1/1975 | Roe et al. .................... | 235/432 |
| 4,002,887 A | * | 1/1977 | Ouimette .................... | 235/449 |
| 4,468,752 A | * | 8/1984 | Chatham ..................... | 375/368 |
| 4,755,069 A | * | 7/1988 | LaManna et al. ........... | 400/130 |
| 4,866,545 A | * | 9/1989 | LaManna et al. ............. | 360/53 |
| 4,900,168 A | * | 2/1990 | LaManna et al. ........... | 400/130 |
| 5,155,584 A | * | 10/1992 | Taguchi et al. ........... | 348/231.6 |
| 5,260,776 A | * | 11/1993 | Taguchi et al. ............... | 386/38 |
| 5,293,280 A | * | 3/1994 | Ishikawa et al. ........... | 360/74.1 |
| 5,698,832 A | * | 12/1997 | Someya et al. ............. | 235/449 |
| 6,021,281 A | * | 2/2000 | Tanaka et al. ............... | 396/319 |
| 6,141,161 A | * | 10/2000 | Sato et al. ...................... | 360/2 |
| 6,431,445 B1 | | 8/2002 | DeLand, Jr. et al. | |
| 6,646,565 B1 | * | 11/2003 | Fu et al. ...................... | 340/687 |
| 2001/0025885 A1 | * | 10/2001 | Kuroiwa et al. ............ | 235/449 |
| 2005/0006471 A1 | * | 1/2005 | Bedell et al. ................ | 235/440 |

OTHER PUBLICATIONS

Cypress Microsystems, Inc. 2003; PSoC Magnetic Card Reader; Application Note—Magnetic Strip Reader; Web Site: http://www.cypressmicro.com.
MAGTEK, Registered to ISO 9001:2000; I/O Interface for TTL Magnetic Strip Readers, Technical Reference Manual, Manual Part No. 99875148 Rev-6, Dec. 2003.
MAGTEK, Registered to ISO 9001:2000; Matnetic Card Reader Design Kit, Technical Specification, Part No. 99821002 Rev 16, Jul. 2003.
MAGTEK, Registered to ISO 9001:2000; Slim Profile Card Guide Swipe Reader, Technical Reference Manual, Part No. 99875147-3, May 2003.

* cited by examiner

*Primary Examiner*—Kimberly D. Nguyen
(74) *Attorney, Agent, or Firm*—Howison & Arnott, L.L.P.

(57) ABSTRACT

A magnetic stripe card reader for reading a magnetic stripe on a card having at least one track of magnetically stored information stored thereon as a stream of encoded discrete data bits separated by bit times is disclosed. Aa magnetic head is provided for reading the magnetic pulses as the magnetic stripe is passed thereby to output a time varying analog signal. A data converter incorporated on an integrated circuit is then operable for converting the analog signal to a digital time series of digital values. A processor incorporated on the integrated circuit can ten process the digital output of the data converter and is operable to first determine potential bit boundaries and then recover timing information from the digital time series to discriminate the bit times between data bits. The value of each data bit is then determined during each bit time to provide a stream of extracted data bits.

10 Claims, 5 Drawing Sheets

MAGNETIC STRIPE READER

CROSS-REFERENCE TO RELATED APPLICATIONS

N/A.

TECHNICAL FIELD OF THE INVENTION

The present invention pertains in general to magnetic stripe readers and, more particularly, to a processor controlled magnetic stripe reader utilizing a mixed-signal multiprocessing device.

BACKGROUND OF THE INVENTION

Magnetic stripe cards, such as credit cards and the such, have data encoded thereon in a plurality of tracks along a magnetic strip. Each of these cards contains one, two or three tracks, each track having a different purpose. Typically, the first and third tracks will have 210 bits per inch, and track two has 75 bits per inch. Each of these has a different information content. This information is stored as digital "1's" and "0's" with the use of magnetic flux transitions. Therefore, there will be a plurality of positive transitions followed by negative transitions. A "0" is defined by the largest distance between two transitions, whereas a "1" is defined as an additional magnetic flux transition disposed there between. The magnetic heads detect these magnetic flux transitions and provide an output signal in response to passing the magnetic strip thereby.

The detection of the magnetic flux transitions requires an asynchronous system, since the card can be swiped at many different speeds. In addition, although there are provided many different speeds, the speed can even change during a single swipe. Thus, it is necessary to have a system that will detect these pulses, recover the clock therefrom and then detect whether the transitions represent a "0" or a "1."

In order to provide a complete solution in the form of a compact magnetic stripe reader, it is necessary to provide within the package data extraction and processing. The data extraction merely requires that the digital string be extracted therefrom and provided as an output. Additionally, this digital string can be decoded so the encoded information therein is output therefrom. Prior are systems have utilized a programmable amplifier for amplifying the signal which is then input to comparators. Typically, there is some type of CPU that is associated therewith and a serial port interface such as a UART.

SUMMARY OF THE INVENTION

The present invention disclosed and claimed herein comprises, in one aspect thereof, a magnetic stripe card reader for reading a magnetic stripe on a card having at least one track of magnetically stored information stored thereon as a stream of encoded discrete data bits separated by bit times. A magnetic head is provided for reading the magnetic pulses as the magnetic stripe is passed thereby to output a time varying analog signal. A data converter incorporated on an integrated circuit is then operable for converting the analog signal to a digital time series of digital values. A processor incorporated on the integrated circuit can then process the digital output of the data converter and is operable to first determine potential bit boundaries and then recover timing information from the digital time series to discriminate the bit times between data bits. The value of each data bit is then determined during each bit time to provide a stream of extracted data bits.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
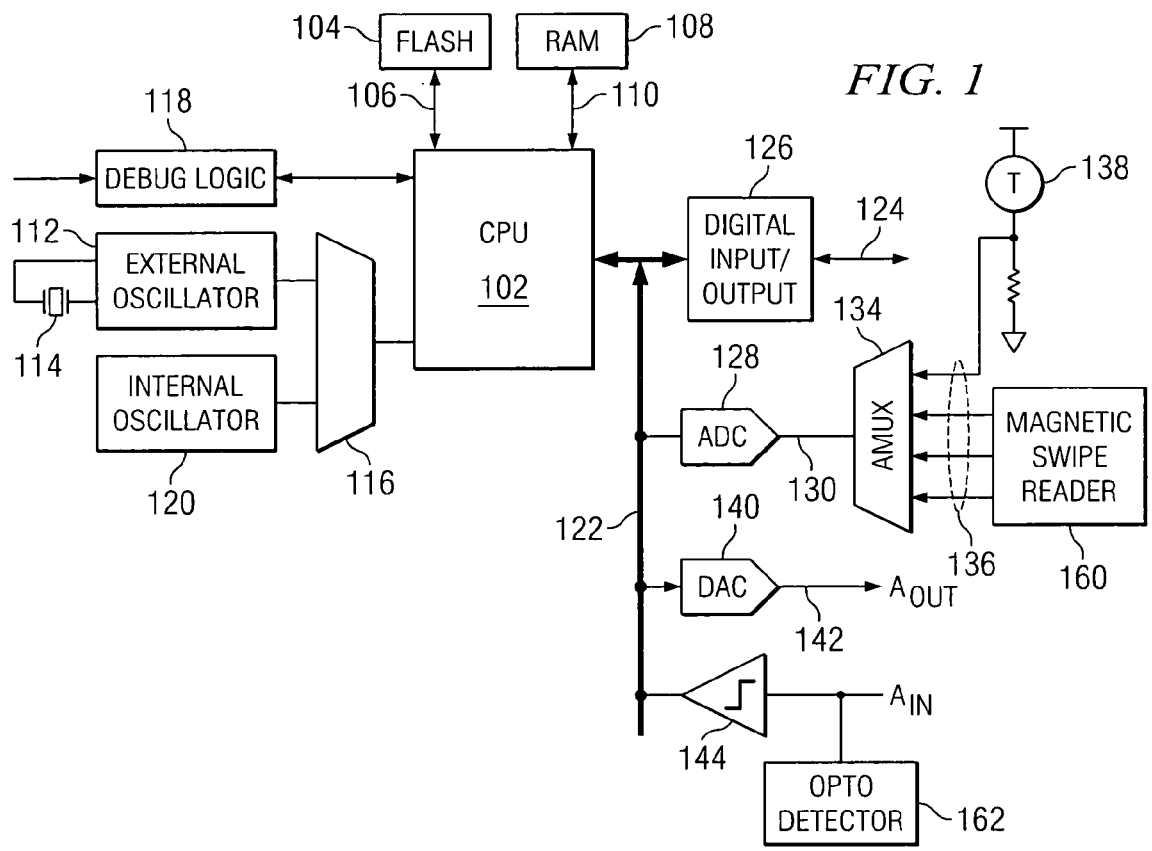
FIG. 1 illustrates an overall schematic diagram of the magnetic card reader and the processing section in the form of the mixed-signal data processing unit.

Referring now to FIG. 1, there is illustrated a block diagram of a mixed signal integrated circuit including a SAR analog-to-digital converter (ADC). This is a conventional processor based mixed signal circuit of the type C8051F330, manufactured by Silicon Laboratories, the present assignee. This mixed signal circuit includes at the heart thereof a CPU 102, which is an 8051 CPU, a conventional processor core. This CPU 102 interfaces with memory, there being a flash memory 104 interfaced with the CPU 102 through a bus 106, and a random access memory (RAM) 108 interfaced to the CPU 102 through a bus 110.

The CPU 102 operates on multiple clocks. There is provided an external oscillator circuit 112, which is operable to be controlled by an external crystal 114, it being noted that the external oscillator circuit 112 is actually disposed on-chip. This oscillator is a high frequency oscillator and operates at a frequency of around 25 MHz. This is input to the CPU 102 through a selection multiplexer (MUX) 116. Alternatively, the CPU 102 can operate off of a low frequency internal oscillator 120, this being a 10 KHz oscillator. Typically, the primary processing function of the CPU 102 is carried out with the high frequency oscillator 112 and, when the CPU 102 is placed in a "sleep" mode, the lower frequency oscillator is utilized. The processing operations are typically minimal at the lower frequency. The CPU 102 also includes a debug interface block 118 that is operable to interface external data with the CPU 102 for writing in the flash memory 104, this being a conventional operation.

The CPU 102 interfaces with a digital on-chip bus 122, which interfaces with a plurality of digital input/output pins 124 through a digital I/O block 126. This digital I/O block 126 is operable to allow various digital interfaces. This can be parallel digital data or it can be serial data. Serial data will typically be interfaced with some type of serial data format. This can be an RS232 data format, an I²C format, or any other type of serial data format. This allows digital data to be received or transmitted. Additionally, the digital bus 122 is interfaced with the digital input of an analog-to-digital converter (ADC) 128 to receive digital data therefrom. The input to the ADC 128 is provided on an input analog line 130. The analog input to the ADC 128 is received from the analog multiplexer 134, which receives a plurality of analog inputs on analog input lines 136. These analog inputs can be received from any source, such as transducers, etc. One embodiment of this analog multiplexer is illustrated in U.S. Pat. No. 6,507,215, issued Jan. 14, 2003, and assigned to the present Assignee, which reference is incorporated herein in its entirety by reference. One illustrated input to the multiplexer 134 is from a temperature sensor 138, which is an internally generated temperature value typically generated from a band-gap reference voltage generator contained on-chip. The output of this temperature sensor is connected to one of the analog input lines 136 and is selected for measuring ambient temperature of the chip, which may be the ambient temperature of the surroundings.

In addition to the analog multiplexer 134 and the ADC 128, digital information on the bus 122 can be provided as the input to a digital-to-analog converter (DAC) 140, which can be converted to an analog output signal on an analog output line 142. The comparator function is provided by a comparator 144 which receives an analog input for comparison to an internally generated reference voltage or to an external reference voltage (not shown) to provide a selectable output that can be driven to the digital bus 122 or to an interrupt input on the CPU 102. Although illustrated as being connected to the digital bus 122, it should be understood that the output of comparator 144 could be connected to multiple different interrupts on the processor.

The analog multiplexer 134 is operable to interface with a magnetic stripe reader 160. The magnetic stripe reader 160 is operable to provide differential outputs, a plurality of magnetic heads associated therewith. These basically provide a low signal non-powered output that represents a flux transition. By examining the peaks of these flux transitions, data and clock information can be retrieved. In the disclosed embodiment, the magnetic stripe reader 160 has associated therewith three magnetic heads, such that a magnetic card can be passed through the magnetic stripe reader 160, which magnetic card has three tracks of information recorded thereon which can be extracted therefrom simultaneously and processed by the system of FIG. 1, a single chip solution.

In addition to the magnetic stripe reader 160 disposed external to the integrated circuit, there is also a detection circuit 162 that is provided. This is provided such that the presence of the card can be detected such that the CPU 102 can be placed into a sleep mode. In one embodiment, this could be an opto detector. This will be described in more detail herein below.

Figure 2:
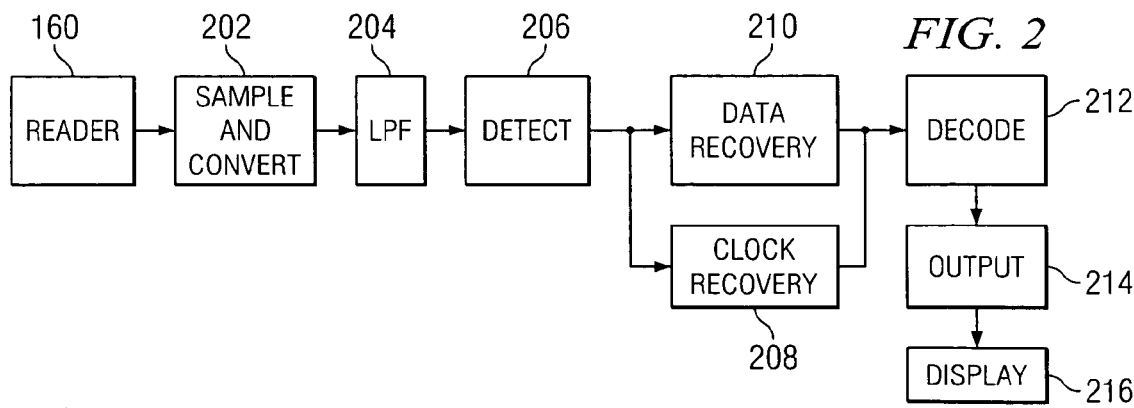
FIG. 2 illustrates a flow diagram for the magnetic stripe reader.

Referring now to FIG. 2, there is illustrated a diagrammatic flow for the operation of the system of FIG. 1. The reader 160 is operable to provide an output to the microprocessor unit, which is then passed to block 202 which is operable to sample the output wave form and convert this to digital values. In the digital domain, this is then processed through a low pass filter block 204. The low pass filter 204 is a software low pass filter that is facilitated by executing instructions in the CPU 102. This is typically an infinite impulse response (IIR) filter. Once filtered, then the sampled wave form is processed through a detect block 206 which is operable to perform a peak detection on the digital data. This determines where the maximum values are and where the minimum values are. This will be described in more detail herein below. Once the peaks have been determined, then clock information is recovered therefrom in a clock recovery block 208 and data is recovered or extracted therefrom in a block 210, this being either a digital "1" or a digital "0." The recovered data is then decoded in a decode block 212, this being a conventional decode operation. The decoded data is then provided to an output, which can be a serial peripheral interface port, represented by a block 214. This could also utilize other serial interfaces, such as a UART interface, an I²C interface, etc. Further, this output could be provided to a display 216 for displaying the information decoded therefrom. Alternatively, the raw data in the form of the digital character string could be output prior to decoding.

Figure 3:
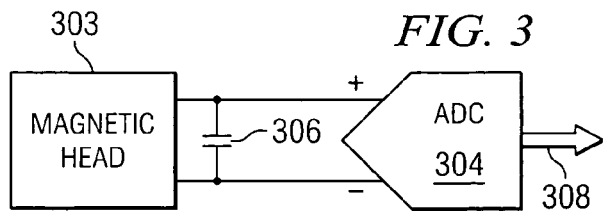
FIG. 3 illustrates a diagrammatic view of a single magnetic head and its interface to an ADC.

Referring now to FIG. 3, there is illustrated a diagrammatic view of a magnetic head 303 that is interfaced with a conventional differential input ADC 304. The differential input to the ADC 304 has, in one embodiment of the disclosure, a small capacitor 306 disposed there across. This capacitor is not absolutely necessary. The ADC 304 is operable to decode the differential output into digital values for output on a digital bus 308. Although the ADC 128 in FIG. 1 was illustrated as being a single ended input, a differential input ADC structure can be realized. Typically, this is realized utilizing two inputs that are selectable by the multiplexer 134 and there will typically be two data conversion engines, one for the positive input and one for the negative input. Again, this is inherent to the mixed-signal processor unit disclosed herein above with respect to FIG. 1.

Figure 4:
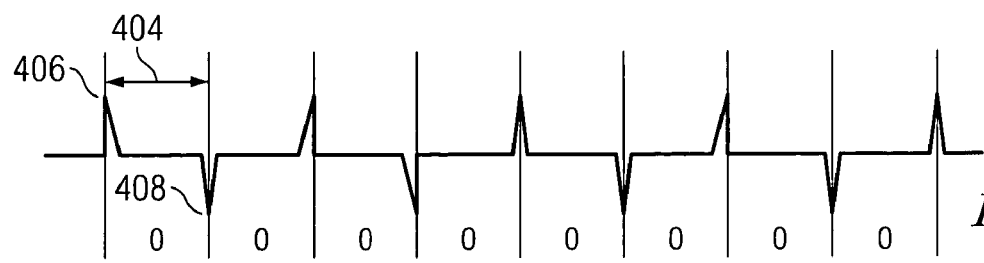
FIG. 4 illustrates a diagram of the magnetic flux encoding on a stripe.

Referring now to FIG. 4, there is illustrated a pulse diagram for the flux transitions associated with the input signal. Typically, the track will have a plurality of leading "0's" that are utilized for the clock recovery operation. These flux transitions will be separated by the proper distance, wherein variations in the proper distance between flux transitions is referred to as "jitter." Therefore, if the card is swiped through the reader in an even and continuous manner, then the leading 0's, represented in FIG. 4, will be separated by a bit time 404 of the same magnitude. There will be a positive going pulse 406 followed by a negative going pulse 408, and so on. If the positive and negative going pulses are separated by the bit time 404, this represents a "0" as an output.

Figure 5:
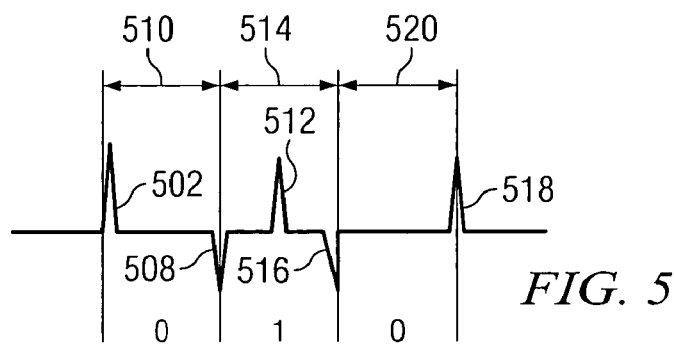
FIG. 5 illustrates a more detailed view of the magnetic stripe encoding for two different digital states.

Referring now to FIG. 5, there is illustrated a diagram of the pulse string showing the inclusion of a logic "1." therein. A first positive going pulse 502 is followed by a negative going pulse 508 and separated therefrom by a bit time 510. This represents a logic "0." The negative going pulse 508 is followed by a positive going pulse 512 which is less than a bit time separation from the negative going pulse 508. Since it is less than a full bit time, this indicates that this is associated with a logic "1." The full logic "1" will occur in one bit time, a bit time 514, such that another negative going pulse 516 follows the positive pulse 512. It is noted that the negative going pulses 508 and 516 are separated by the bit time 512. Followed by the logic "1" is a logic "0," represented by a positive going pulse 518 following the negative going pulse 516 are separated therefrom by a bit time 520.

Thus, the data output by the pulse string between positive going pulse 502 and positive going pulse 518 will be a string "010."

Figure 6:
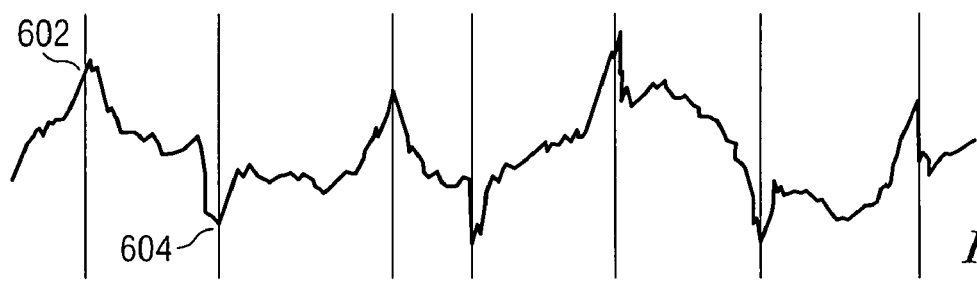
FIG. 6 illustrates an actual output of the magnetic head.

Referring now to FIG. 6, there is illustrated a diagram of an actual low level voltage output from the magnetic head 303. This represents that very low level signals that may result from quickly passing the card through will not be as defined as the pulse string in FIGS. 4 and 5; rather, they are subject to noise, the very weak recording on the magnetic stripe and various other factors. Therefore, there must be some type of detection operation in order to determine whether a pulse exists, and also to insure that false pulses are not detected. It can be seen that the pulses are separated by differing amounts of time, due to the speed at which the card is striped through the reader. Also, the pulses may not be strong, or clearly defined. In order to determine when a positive or negative pulse occurs, the peak detection algorithm utilized is one wherein each sample is time stamped in the sampling operation and then a maximum time stamp and a minimum time stamp are defined, such that the samples there between are thrown out. The maximum time stamp is determined by comparing adjacent samples to determine if the value of the sample has increased or decreased from prior samples and, if increasing, then determining if it has exceeded the previous time stamped minimum by a predetermined amount. If so, this will be determined to be a new maximum value. This value will be updated as long as the subsequent values are greater, and will be "set" as the maximum time stamped value when the subsequent values decrease below the last determined maximum by a predetermined threshold, at which time a determination is made that the last determined maximum constitutes a valid peak and the new value is now the minimum. This will continue to go from a positive peak to a negative peak by determining, again, when the waveform has ceased decreasing, as indicated when the slope turns positive. This is facilitated by comparing adjacent samples and determining if the sample has turned around and gone positive from a last determined minimum above a certain threshold. For example, it can be seen that there is an initial peak 602 that can be seen in the wave form. The wave form continues to go downward with a few slight upward peaks due to noise. However, the peaks are not large enough to indicate that the wave form has "turned around" toward a positive increase. This occurs after a time stamped minimum 604 wherein all samples thereafter have been substantially increasing and, once they go above a certain threshold, then this time stamp minimum is determined to be the negative peak. This continues for each peak thereafter.

Figure 7:
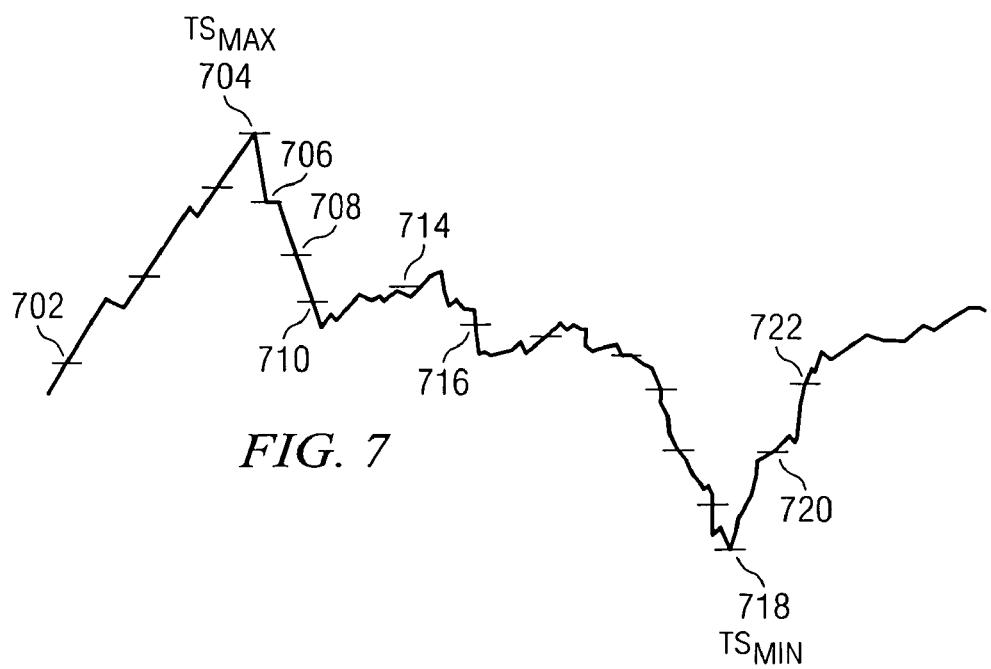
FIG. 7 illustrates a diagrammatic view of a portion of the output showing the peak detection.

Referring now to FIG. 7, there is illustrated a detail of two peaks and the sampling operation thereof. Initially, there is a sample 702 taken followed by subsequent samples of a peak sample 704. At this peak sample, the next sample, a sample 706, is detected that is lower in value and, therefore, the maximum time stamp will remain the same. Of course, if the next sample went above the value of the sample 704, then this new sample would be determined to be the maximum value. However, the next sample, a sample 708 again is lower and, once it falls below sample 704 by a predetermined threshold value, then the sample 704 will be declared the peak. This sample evaluation will continue until the difference between previous samples and a future samples has increased such that a negative peak has occurred. For example, there is a sample 710 that follows sample 708 with a slight increase at a sample 714. However, there is not enough of an increase to indicate that this is now a transition from a negative peak to a positive peak. As such, the sample 710 at that point will be temporarily declared as the minimum, which will change later when sample 716 is taken, and so on. This will continue a negative trend until a minimum sample 718 is determined, due to the fact that the next two samples 720 and 722 are increasing and much higher and above a certain predetermined threshold.

Figure 8:
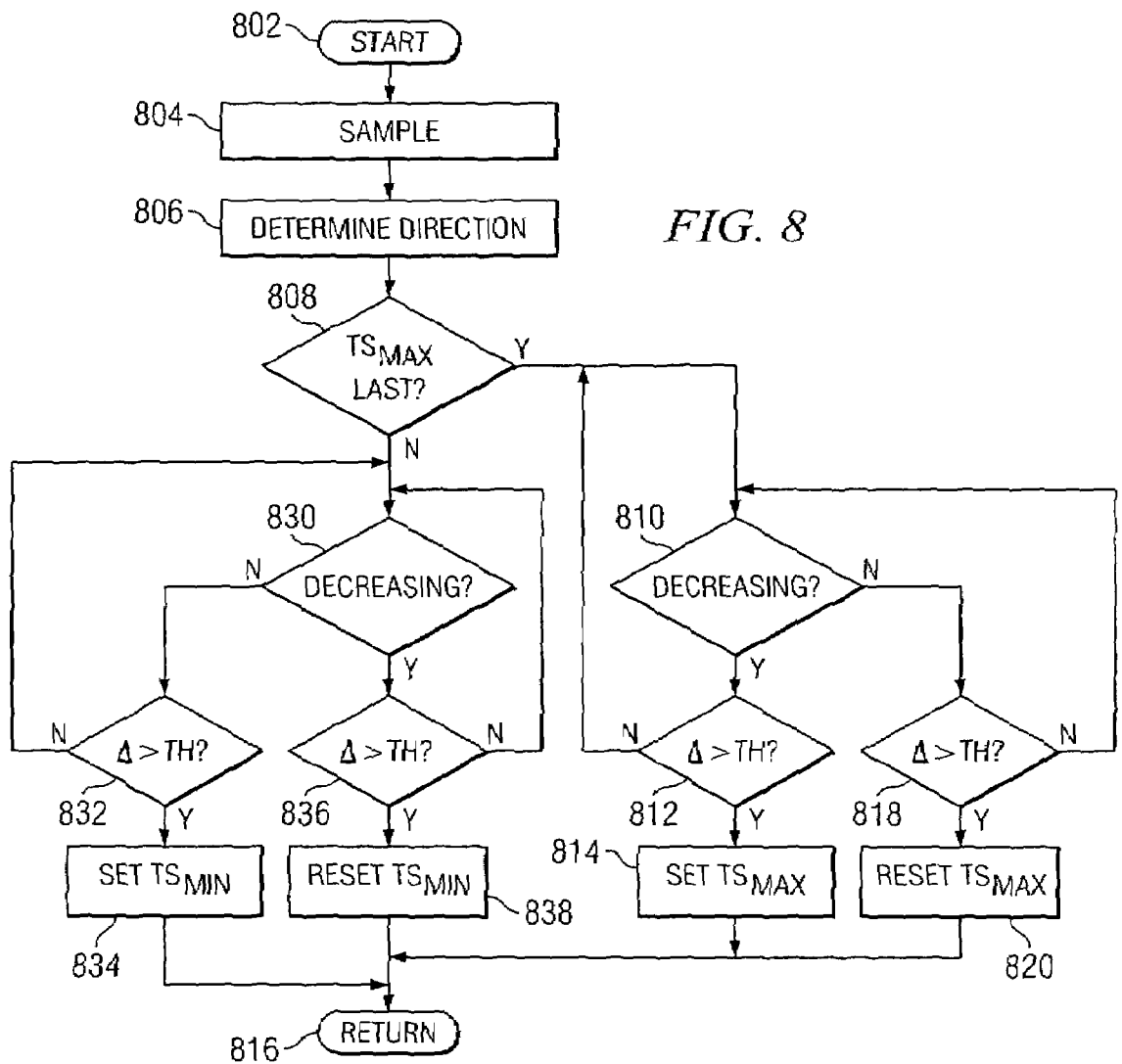
FIG. 8 illustrates a flow chart for the peak detection operation.

Referring now to FIG. 8, there is illustrated a flow chart for the peak protection operation, which is initiated at a start block 802 and then proceeds to a function block 804 to sample the input data and then to a function block 806 to determine the direction of the change in the samples. The program then flows to decision block 808 to determine if the maximum time sample was the last declared peak. If so, this indicates that it is a downward direction and the program will flow along a "Y" path to a decision block 810 to determine if the direction is decreasing. If yes, this indicates that it is going toward a negative peak. However, at this point, the maximum time stamp sample is only temporary and it has not been determined concretely or declared that this is the peak. The program flows along the "Y" path to a decision block 812 to determine if the sample has decreased to a point wherein the difference between the last temporary determined maximum peak and the current value is greater than a predetermined threshold, which indicates that the previously determined positive peak, $TS_{max}$ is a valid peak. The program will then flow along a "Y" path to set this value as the positive peak at a function block 814 and then the program flows to a return block 816.

If it had been determined at the decision block 808 that the last determined value was for the purpose of determining a positive peak and that the decision block 810 determined it was an increasing sample value by comparing the current sample value to the last temporarily declared peak value, the program would flow along an "N" path from decision block 810 to a decision block 818 in order to determine if the increasing value is greater than a predetermined threshold, this being a different threshold than that in decision block 812 in that it is used to determine whether a new peak value should be declared. If it is not greater than the threshold, the program will flow along a "N" path back to the decision block 810. Once it has been determined that a sufficient increase has occurred to declare a new temporary maximum peak value, the program will flow along a "Y" path to a function block 820 to reset the value of the maximum value of $TS_{max}$, and then the program flows to a Return block 816. This will continue until the value of the $TS_{max}$ is set in function block 814.

If, at decision block 808, it were determined that the $TS_{min}$ was the last time stamp set, then the program will flow along the "N" path from the decision block 808 to a decision block 830 in order to determine if the value is increasing or decreasing. If increasing, the program will flow to a decision block 832 in order to determine if the increase is above a predetermined threshold. If so, this indicates that the peak has occurred and is sufficient change results in the declaration of the last temporary stored value of $TS_{min}$ is the negative peak value, this being set in a function block 834. The program then flows to the Return block 816. If it were determined by the decision block 830 that this were a decreasing value, i.e., the peak value may not have been met, the program flows to a decision block 836 to determine if the decrease is sufficient to reset the $TS_{min}$ value, as indicated by a function block 838, and then the program flows to the Return block 816. It can therefore be seen that all that is required to be stored for processing is the time stamp value.

Figure 9:
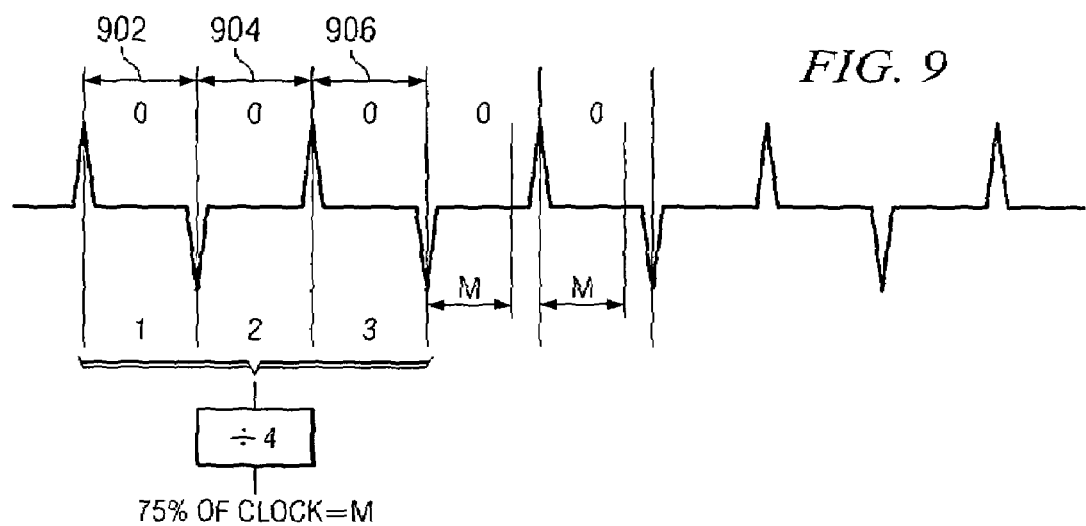
FIG. 9 illustrates a diagrammatic view of the pulse output for use in clock recovery.

Referring now to FIG. 9, there is illustrated a diagram of a pulse string for use in recovering the clock and for maintaining the synchronization to the clock, it being noted that this is an asynchronous system. As noted herein above, there will be a header of a plurality of "0's" for the use in synchronizing the system or recovering the basic clock. Once the clock is retrieved, there will be a basic "bit time" determined. Thereafter, the clock is maintained on a sliding scale by constantly looking at the last three bit times that were determined. These are illustrated by bit time 902, bit time 904, and bit time 906, all associated with a logic "0" value. It is generally necessary to divide these three values in the sum by a value of "4." This will provide a value "M" that represents 75% of the bit time. Thereafter, a test will be made to determine if a next negative going pulse or a next positive going pulse has occurred prior to 75% of a bit time. However, this 75% value could be a different value. It is noted that a negative going pulse or a positive going pulse that occurs at ½ bit time would represent the occurrence of a logic "1." Thus, by testing at 75% of the bit time, this provides some margin for error. If it is greater than "M," then it is a logic "0" and if it is less than "M," then it is a logic "1." Therefore, for calculation of the next clock cycle, this pulse will be ignored, it expecting the next pulse to be the pulse utilized for calculating the clock, as it will recognize this as a logic "1."

Figure 10:
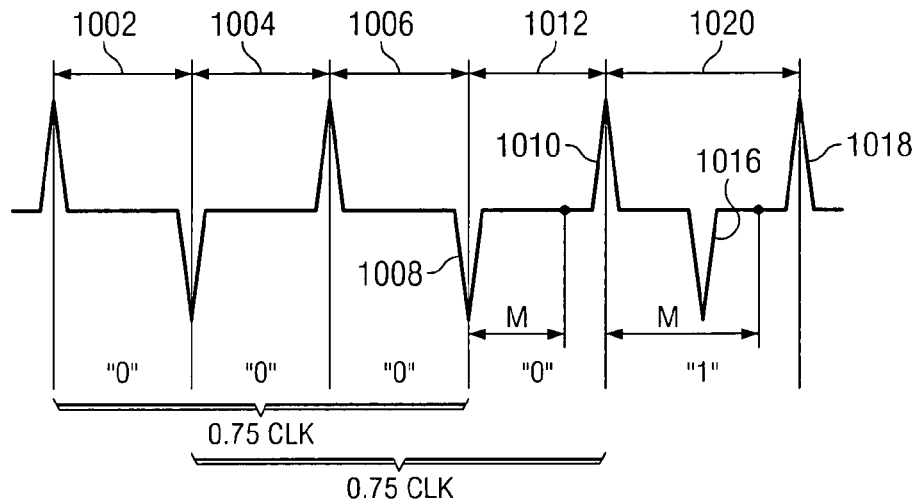
FIG. 10 illustrates a more detailed diagram of the pulse output for clock recovery.

Referring now to FIG. 10, there is illustrated a timing diagram illustrating the determination of a logic "1." In this embodiment, a first determination of the bit time is made utilizing three adjacent bit times 1002, 1004 and 1006. These are utilized to determine 75% of a bit time. This is used for measuring from a negative going pulse 1008 to a positive going pulse 1010 and making a determination if the pulse 1010 occurs more than M after pulse 1008. If so, this is determined as being a "0" for another bit time 1012. The new bit time is calculated utilizing the bit times 1004, 1006 and 1012, dividing the sum of these three bit times by four, this representing 75% of the bit time. Of course, the complete bit time can be calculated therefrom. In this example, this is determined between pulse 1008, with pulse 1010 resulting in the declaration of a logic "0" associated therewith. After pulse 1010, a negative going pulse 1016 is determined to have occurred less than 0.75 bit time after pulse 1010. This is declared to be a logic "1." The next pulse, a positive going pulse 1018 is then utilized as the measurement for the next clock, this being a bit time 1020. The next clock will be calculated utilizing the bit times 1006, 1012 and 1020.

Figure 11:
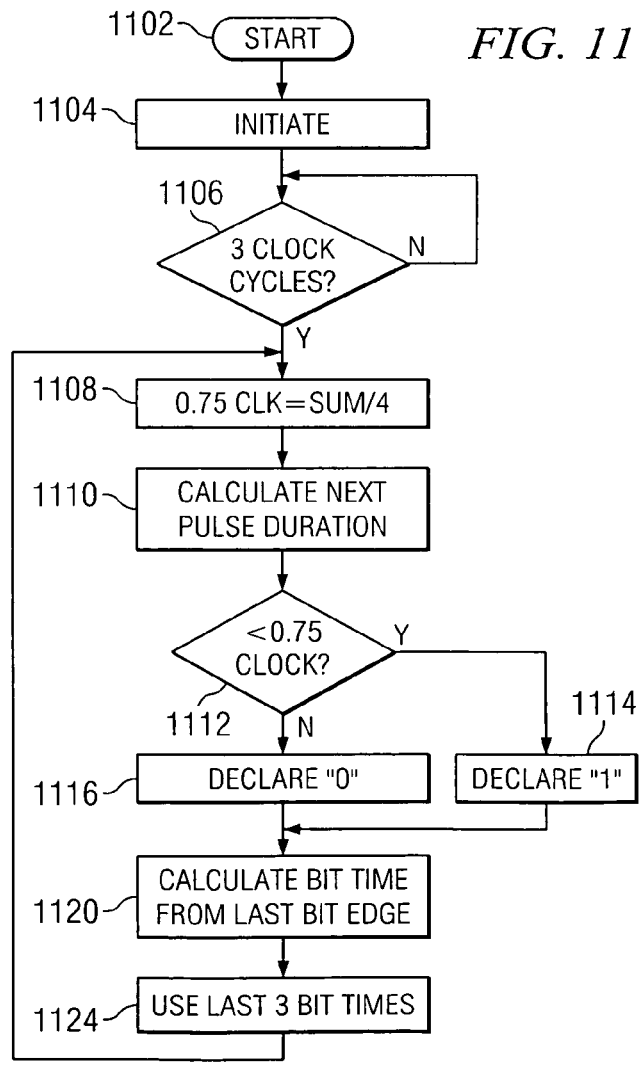
FIG. 11 illustrates a flow chart for the clock recovery.

Referring now to FIG. 11, there is illustrated a flow chart for the clock recovery operation. This is initiated at a Start block 1102 and then proceeds to a block 1104 to initiate the operation, this clock recovery operation basically requires three clock cycles to be recovered to determine three separate bit times, as indicated by decision block 1106. When three bit times have been received, it being noted that the initial startup is a sequence of logic "0" values, then the program proceeds along the "Y" path to a function block 1108 to determine the value of the bit time by recognizing that the sum of the three values divided by "4" will equal 75% of a bit time. Of course, if it were divided by "3" it would be the full bit time. The program then flows to a function block 1110 to calculate the next pulse duration. A determination is then made as to whether the time between the pulses is less than 75% of a bit time, as indicated by a decision block 1112. If so, this indicates that it is a "1," in function block 1114 and, if not, this indicates that it is a "0," as indicated by a function block 1116. The program then flows to a function block 1120 in order to calculate the bit time from the last bit edge such that the current calculated bit time and the bit times for the prior two determined bit times can be used for the next clock determination, as indicated by a function block 1124. The program then returns to function block 1108 to continue the clock recovery operation.

Figure 12:
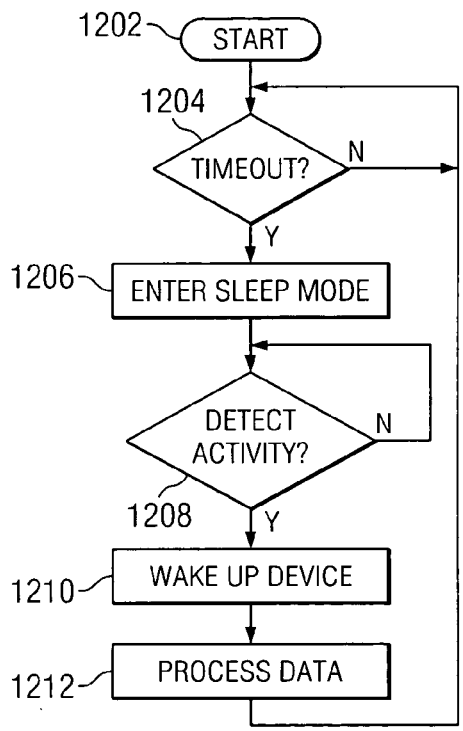
FIG. 12 illustrates a flow chart for the sleep mode of operation.

Referring now to FIG. 12, there is illustrated a flow chart for the power down mode. The flow chart operation is initiated at a block 1202 and then proceeds to decision block 1204. In this mode, the system is in an operating mode initially when powered up. However, there is a detection mode that detects whether data is being output by the ADC 128. If no information is being done over a predetermined time, an internal timeout will be allowed to continue to run until it reaches the end of its count value. At this time, the program will timeout and will flow along the "Y" path to a function block 1206 in order to enter the sleep mode. In this mode, the clock will enter low power operation. In low power operation, the processor can halt operations or it can operate down to a very low frequency. For example, in the high power full processing mode, the processor will run at a frequency of around 20 MHz. In the low power mode, the processor will operate at 32 MHz. There could even be a further mode, wherein the processor goes into a deep sleep mode wherein all established registers are stored in non-volatile memory such as flash, and then substantially all processing terminated. The program then flows to a decision block 1208 in order to determine if any activity has been detected. The processor can be placed back into a full operating mode within a very short period of time. However, it is noted that the ADC 128 must be running in order to detect pulses that can be converted to digital values for use by the processor in determining activity. Therefore, a deep sleep mode would not be sufficient, as the ADC 128 would have to be operating. Further, if external detection circuitry were utilized to evaluate initial pulses, then it is not possible to utilize these initial pulses for the purpose of detecting activity and waking the part up. There is no provision in the formatting to "throw away" these initial pulses for use with an activity detection operation; rather, they must be utilized in the clock recovery and data extraction operation. Therefore, there must be some detection device that detects the presence of the card prior to the card actually being swiped. This is facilitated with the opto electric detector 162 described herein above with respect to FIG. 1. This could be any type of detection device, even a button on the front of the reader. This requires very little power and the output of the opto electric device can be input to the comparator and then the part can be completely woken up and pulled out of the sleep mode prior to the card being swiped. In this manner, no data is lost and the data device will be woken up, as indicated by a function block 1210. The program then flows to function block 1212 in order to process the data and then back to the input of decision block 1204 to determine if the timer has reached an overflow condition due to the fact that it has not been reset by the present activity on the output of the ADC 128.

Figure 13:
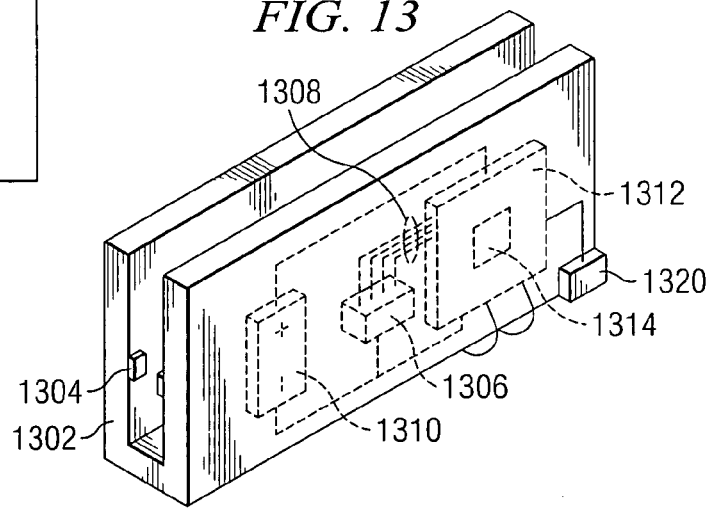
FIG. 13 illustrates a perspective view of the full assembly.

Referring now to FIG. 13, there is illustrated a perspective view of a reader. The reader generally consists of a housing 1302 which is operable to allow a card to be disposed therein. There is provided the opto electric detector 1304 on the inside surface, such that when the card is disposed within the reader, a detection can be made and the MCU woken up. The magnetic reader head is provided by a block 1306 which can contain one head, two heads or three heads, depending upon how sophisticated the card reading is. This magnetic head 1306 will have a plurality of wires 1308 extending therefrom. Typically, there is a ground for the entire block

1306 and two wires for each head. This is a non-powered block. There will be provided a battery 1310 for powering an MCU circuit block 1312, which has disposed thereon an integrated circuit 1314 that contains the functionality of the embodiment of FIG. 1, this being the mixed-signal processor. This is powered by the power supply 1310. As such, the entire magnetic reader is a self-contained, self-powered unit that could be a hand-held device. It will turn on when a card is swiped and turn off when completed. The output can be stored in flash memory for later retrieval through a serial output port. This serial output port is provided by a "jack" 1320 that allows interface with the MCU 1314.

Figure 14:
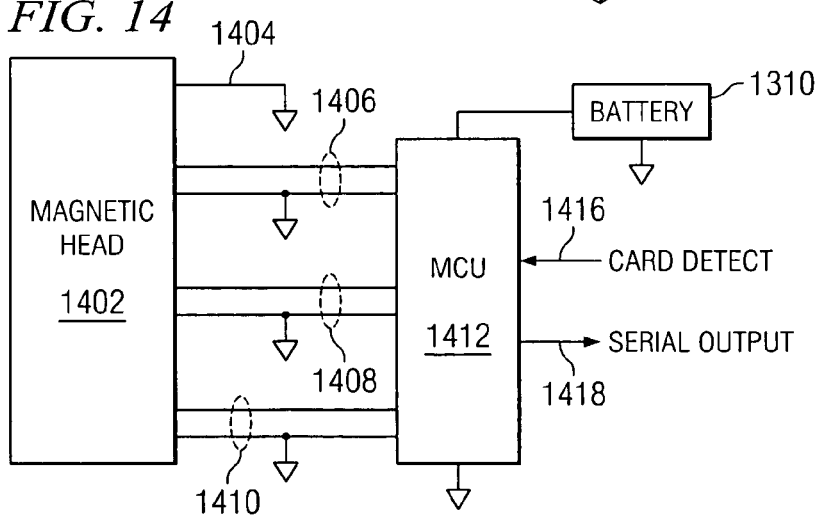
FIG. 14 illustrates a top level view of the parts associated with the embodiment of FIG. 13.

Referring now to FIG. 14, there is illustrated a block diagram of the embodiment of FIG. 13. There is provided one block 1402 representing the magnetic heads of block 1306 of FIG. 13. It can be seen that there is provided a ground line 1404 and three sets of wire pairs 1406, 1408 and 1410, representing the two wires output from each of the magnetic heads in a three head system. These are input to an MCU block 1412, representative of the system of FIG. 1. This receives an input from the battery 1310 and receives a card detect signal on a line 1416 and provides a serial output on a serial output line 1418. Therefore, it can be seen that all that is required for the magnetic stripe reader is the housing 1302, the magnetic head 1306 and an MCU 1412, all of this being a low power single chip operation. Further, it is noted that the amount of data that must be processed during an "on the fly" swipe and decode operation is fairly significant. For example, in the MCU that is described herein above in this example, the ADC 128 can process 200 Kilosamples per second on all channels. For three channels, this would result in 67 Kilosamples per second per channel if they were all sampled at the same rate. However, they can be sampled at different rates due to the fact that they contain different amounts of data, since the dat is stored in bits per inch. This is a measure of how fast the card can be scanned, samples taken in and processed. The processing, of course, can occur at a much faster rate, since the clock that the processor runs on operates at 24.5 MHz. Therefore, a significant amount of processing could be facilitated. In this embodiment, there could even be provided a display associated with the housing 1302 which could display the information on the card after decoding thereof.

Although the preferred embodiment has been described in detail, it should be understood that various changes, substitutions and alterations can be made therein without departing from the spirit and scope of the invention as defined by the appended claims.

What is claimed is:

1. A magnetic stripe card reader for reading a magnetic stripe on a card having at least one track of magnetically stored information stored thereon as a stream of encoded discrete data bits separated by bit times, comprising:
a magnetic head for reading the magnetic pulses as the magnetic stripe is passed thereby to output a time varying analog signal;
a data converter incorporated on an integrated circuit for receiving and converting the raw analog signal to a digital time series of digital values representing the time varying analog value of the magnetic pulses; and
a processor incorporated on said integrated circuit for processing said digital output of said data converter and operable to:
determine potential bit boundaries in the encoded data bits to define the digital values thereof,
recover timing information from said digital time series to discriminate the bit times between data bits, and
determine the value of each data bit during each bit time to provide a stream of extracted data bits.

2. The reader of claim 1, wherein said processor is further operable to decode the stream of extracted data bits to provide decoded information, said processor having a communication circuit associated therewith and incorporated on the integrated circuit and operable to interface with an external system for transfer of data thereto.

3. The reader of claim 2, wherein the communication circuit comprises a serial communication circuit.

4. The reader of claim 1, wherein said data converter comprises an analog-to-digital converter operating at a predetermined sampling rate for converting samples of the analog signal at the sampling rate to corresponding digital values.

5. The reader of claim 4, wherein the data bits are stored on the magnetic stripe as a series of positive and negative magnetic pulses and said processor includes a peak detector for detecting the presence of a magnetic pulse in the analog signal after conversion to the digital domain.

6. The reader of claim 5, wherein said processor is further operable to filter the digital values with a low pass filter prior to processing by said peak detector.

7. The reader of claim 1, wherein the stored data on the magnetic card is stored on a plurality of separate tracks, such that swiping of the magnetic card can allow for output of a plurality of streams of data at the same time, and further comprising a plurality of magnetic heads, each for reading the magnetic pulses of an associated one of said streams as the tracks are passed thereby to output a time varying analog signal for each of the tracks.

8. The method of claim 7, wherein said data converter comprises an analog-to-digital converter operating at a predetermined sampling rate for converting samples of the analog signals at the sampling rate to corresponding digital values.

9. The method of claim 8, wherein said analog-to-digital converter is multiplexed in operation to sample the outputs of each of the tracks and provide a separate time series of digital data.

10. The method of claim 9, wherein each of the tracks has a different amount of data associated therewith stored in bits per inch, such that the rate of data output from each of the tracks is different, and wherein at least one of the outputs from said plurality of magnetic heads is sampled at a different rate than the others thereof.

* * * * *